United States Patent [19]

Riemscheid et al.

[11] Patent Number: 5,057,057
[45] Date of Patent: Oct. 15, 1991

[54] CONTINUOUSLY CONTROLLABLE DRIVE

[75] Inventors: Helmut Riemscheid, Lohmar; Rolf Cremerius, Bonn; Hans-Joachim Bentz, Essen, all of Fed. Rep. of Germany

[73] Assignee: GKN Automotive AG

[21] Appl. No.: 603,538

[22] Filed: Oct. 25, 1990

[30] Foreign Application Priority Data

Oct. 25, 1989 [DE] Fed. Rep. of Germany ....... 3935446
Apr. 14, 1990 [DE] Fed. Rep. of Germany ....... 4012244

[51] Int. Cl.$^5$ ............................................. F16H 63/00
[52] U.S. Cl. ........................................ 474/69; 474/70
[58] Field of Search .................................. 474/69-75, 474/58, 101

[56] References Cited

U.S. PATENT DOCUMENTS

2,911,961 11/1959 McRae .............................. 474/70 X
3,529,483 9/1970 Warnock ................................ 474/69

Primary Examiner—Thuy M. Bui
Attorney, Agent, or Firm—Toren, McGeady & Associates

[57] ABSTRACT

A continuously controllable drive having a form-fitting power transmission system as a result of the engagement of paired teeth, having a first tooth assembly with toothed segment bars which include teeth of uniform cross-sections with curved center lines which extend in the direction of an input shaft to which they are non-rotatingly as well as axially movably and fixably connected; a second set of teeth at a gearwheel which includes teeth of variable cross-sections with curved center lines with a concave shape which extend in the direction of an output shaft to which the gearwheel is connected and which, starting from a minimum central cross-section of the gearwheel, towards its sides, feature a positive profile displacement and pitch aperture.

30 Claims, 11 Drawing Sheets

CONTINUOUSLY CONTROLLABLE DRIVE

BACKGROUND OF THE INVENTION

The invention relates to a continuously controllable drive having a form-fitting power transmission system as a result of a discontinuous engagement of paired teeth.

Drives with a variable transmission ratio usually serve to extend the speed range at the output shaft in the case of a limited speed range or a predetermined speed at the input shaft. In particular, internal combustion engines of motor vehicles whose effective speed range is small relative to the operating range of the vehicle, require a transmission gear.

Continuously controllable drives have the advantage of offering a higher degree of operating ease and of permitting the operation of the driving source in the consumption-optimized or performance-optimized range, independently of the required output speed. So far, continuously controllable drives have been characterized by low efficiency values and/or high production costs.

SUMMARY OF THE INVENTION

Accordingly, it is an object of the present invention to provide a drive which features the widest possible continuous control range and in which the direction of rotation in the output unit may be changed by simple means.

Pursuant to this object, and others which will become apparent hereafter, one aspect of the present invention resides in providing a first tooth assembly with toothed segment bars which comprise teeth of uniform cross-sections with curved center lines which extend in the direction of circumferential lines relative to the axis of an input shaft to which they are non-rotatingly as well as axially movably and fixably, connected and whose radius of curvature corresponds to the radius of rotation of the toothed segment bars around the drive axis. A second set of teeth is provided at a gearwheel, and comprises teeth of variable cross-sections with curved center lines which extend in the direction of cylindrical lines relative to the axis of the output shaft to which it is connected, whose radius of curvature corresponds to that of the teeth of the toothed segment bars, but in a concave shape, and which, starting from a minimum mean cross-section of the gearwheel, towards its sides, comprise a positive profile displacement and a pitch aperture. Additionally, a control device for the toothed segment bars is provided and comprises rotational guiding means which have established an operating connection with the latter and which is pivotable around at least one axis of adjustment extending at a right angle relative to the axes of the two shafts.

Even at minimum speeds, a drive of the above type is able to achieve maximum output moments, with torque limiting means having to be provided within the drive. While the driving direction of rotation remains the same, the direction of rotation in the output may be reversed without causing any problems while passing through speed zero. The drive comprises a large number of identical parts so that it can be produced at favorable cost.

Essentially, the drive is operated in that the adjustable control device, in the direction of the driving axis, applies an axial component to the toothed segment bars, especially when the teeth are engaged, as a result of which the output gear is driven. Because of the continuous mode of operation, with rigid rotational guiding means substantially positioned in one plane, it is essential for the toothed segment bars to permit uncoupling of the toothed segment bars and the bars or spindles non-rotatingly connected thereto to allow the correct tooth engagement to be found relative to the output gear. To facilitate tooth engagement when the toothed segment bars are uncoupled, it is preferable to provide a synchronizing gear tangentially following the output gear at the running-in end for the toothed segment bars.

According to a first embodiment, the rotational guiding means includes guiding discs provided at both ends in the region of the spindles. The guiding discs are connected to each other via articulated coupling rods, and the guiding discs together with the coupling rods may be set relative to the spindles in the same direction, with the angles of attack, preferably, varying between approximately $+35°$ and approximately $-35°$ and with the $0°$ position being defined as extending at a right angle relative to the input shaft.

To ensure optimum control and regulation of the output speed, both ends of the spindles carrying the toothed segment bars are held in sliding blocks, with the sliding blocks rotating around the input shaft on contact balls guided in running grooves in the guiding discs. It is advantageous for the toothed segment bars to be guided radially inside on guiding rails arranged concentrically relative to the input shaft, with the guiding rail being inserted in and fixed to prisms on the input shaft and with the sliding blocks being held radially inside on the guiding rails while being axially movable relative to each other.

To ensure that during the transmission of power the toothed segments do not move relative to the output gear, it is proposed that the toothed segment bars, the sliding blocks and the spindle, while being connected to form an operational connection with the output gear, should form a rigid power transmitting unit which does not change the respective positions. Furthermore, to ensure a power transmitting contact, it is proposed that spindle journals provided at the axial ends of the spindles should run in bores of the associated sliding blocks and may be non-rotatingly secured in the bores by associated diaphragm expanding springs. Contact sleeves should be inserted into the bores of the sliding blocks, with contact balls loaded by spring packages being arranged in the contact sleeves and with the spindle journals of the spindles being axially movable in the sliding blocks via the contact balls. Also, the spring packages should ensure non-rotating contact between the sliding blocks, the contact balls and the spindle journals of the spindles via contact pins provided in the sliding blocks when the toothed segments on the spindles are positioned within the region of engagement with the output gear.

According to a second embodiment, the guiding pieces engaging the preferably inwardly opening rotational guiding means and connected via spindles or bars to the toothed segment bars, preferably comprise radial journals on which radially movable rollers are guided. In particular, these may be designed as pivot roller bearings.

To achieve a uniform output speed, one portion of the rotational guiding means, in the region where the teeth of the toothed segment bars engage the teeth of the output gear, is designed to be rectilinear and is always positioned in a plane parallel to the axes of rotation of the input shaft and output shaft. Continuous adjustment of the rotational guiding means is effected by rotating or pivoting them around an axis of adjustment extending at a right angle relative to the axes of rotation of the two shafts. To reduce tooth displacement to be offset by the synchronizing gear to a minimum, it is advantageous for the axis of adjustment to intersect the axis of the input shaft at a right angle at a distance, thereby extending tangentially relative to the rotational guiding means. However, a simple design permitting two output shafts involves the axis of adjustment intersecting the axis of the input shaft perpendicularly. This may be achieved, for example, by using circular discs or circular cylindrical segments which are connected to the rotational guiding means and which may be adjusted especially via a worm gear by means of teeth attached to the circular circumference.

In order to save axial length, the spindles on which the toothed segment bars are held so as to be axially movable are designed as hollow spindles and slide on bars which also rotate with the input shaft. The hollow spindles and bars are connected non-rotatingly, thereby permitting the toothed segment bars to be locked relative to the spindles by fixing the rotatable bars with a cam track secured to the housing serving to actuate a coupling device. In this case, as in the case of the above-mentioned diaphragm spring assembly, the maximum holding force has to be set in such a way that slip may occur in order to prevent almost infinite transmission ratios from destroying drive parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
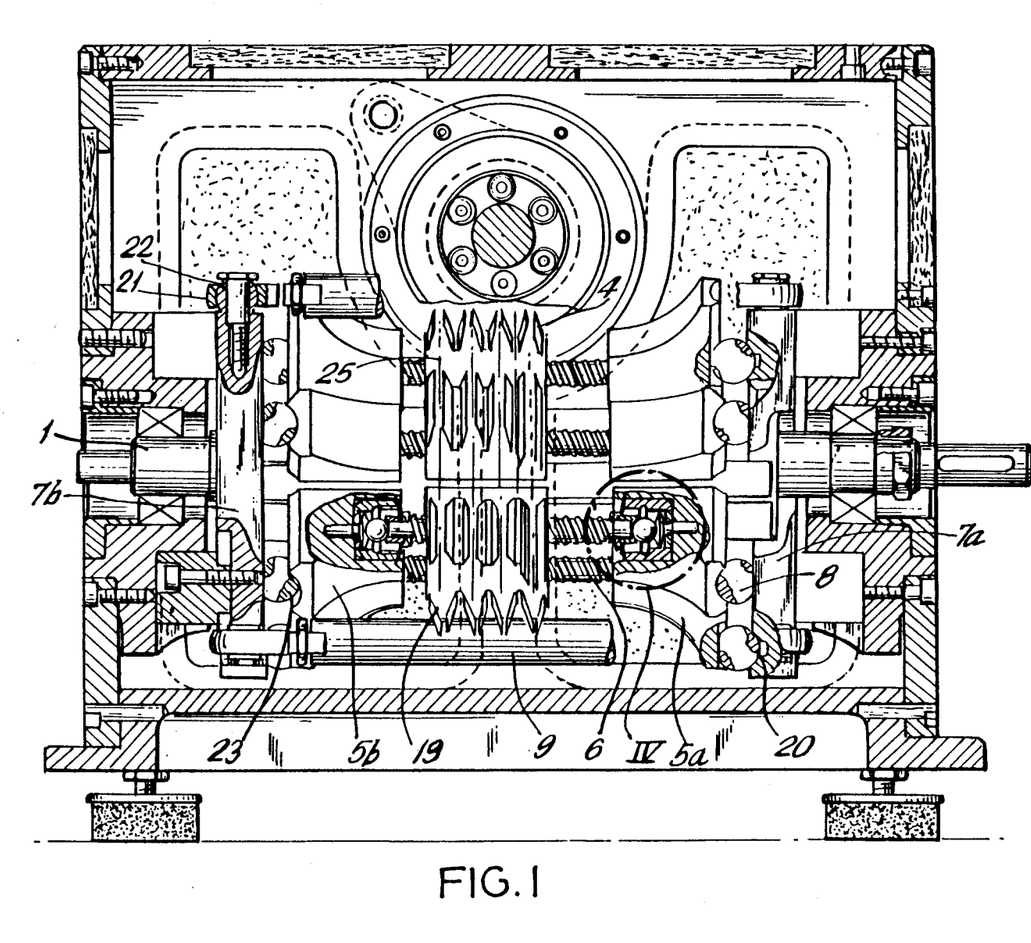
FIG. 1 is a front view of a first drive in accordance with the invention, having toothed segment bars concentrically arranged around an input shaft and an output gear engaging the toothed segment bars.
Figure 2:
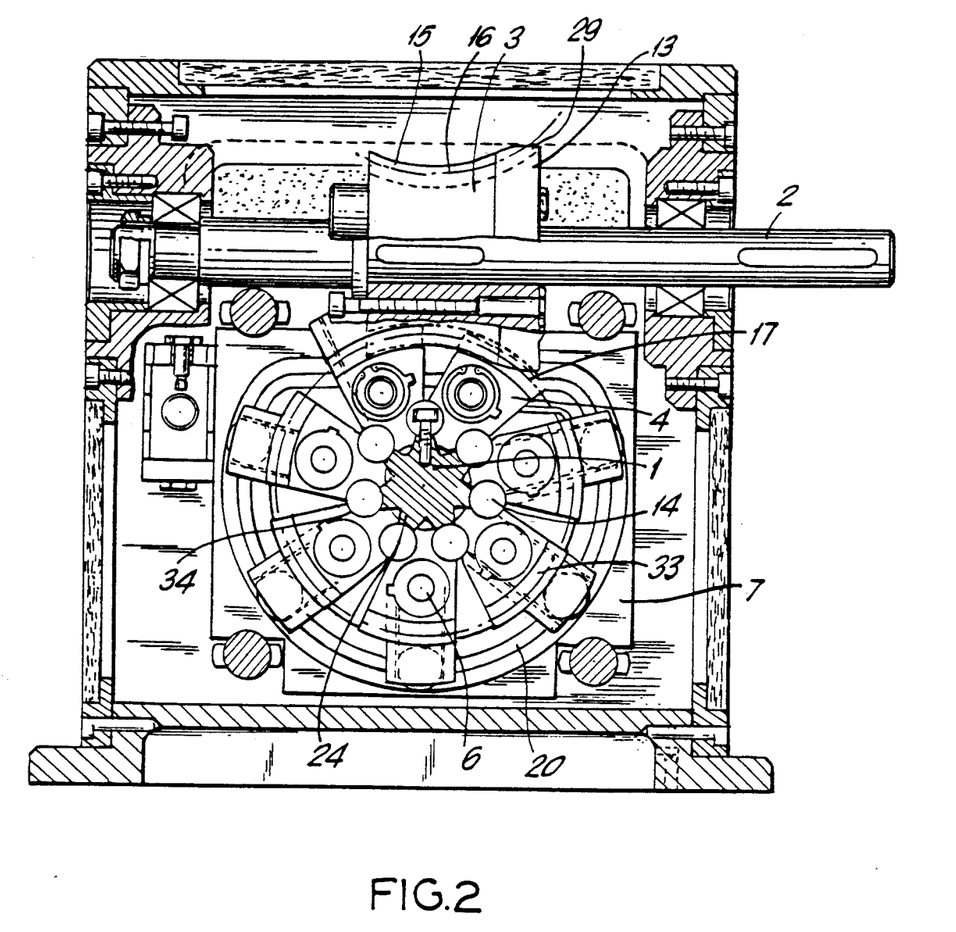
FIG. 2 is a lateral view of a continuously controllable drive according to FIG. 1.

The continuously controllable drive as illustrated in FIGS. 1 and 2 comprises an input shaft 1 around which toothed segment bars 4 are arranged so as to rotate concentrically and so as to be connected non-rotatingly. An output shaft 2 extends at a right angle relative to the input shaft 1 and carries an output gear 3 which may be connected so as to form an operating connection with the toothed segment bars 4.

Figure 3:
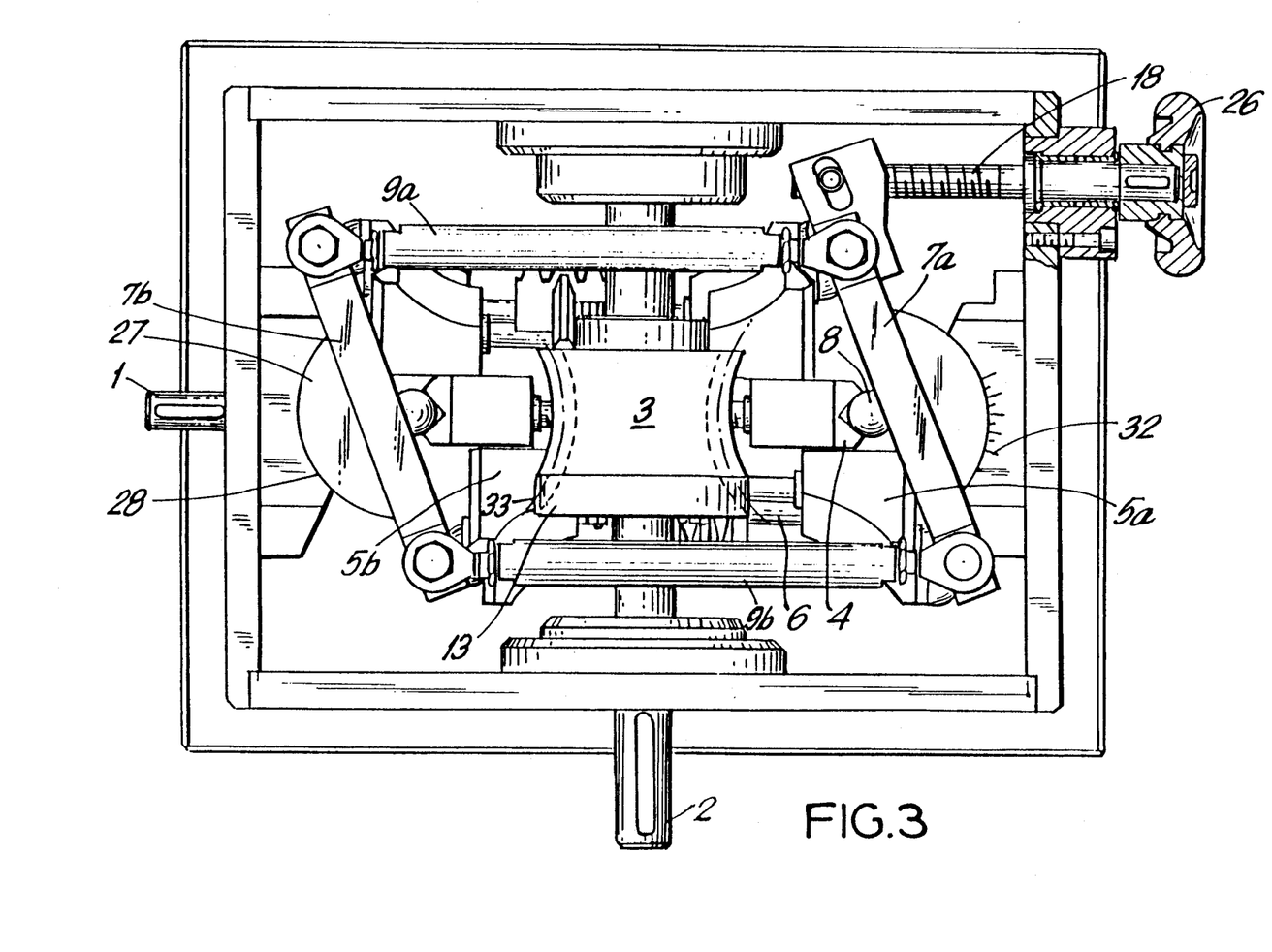
FIG. 3 is a plan view of a continuously controllable drive according to FIG. 1.

As shown in FIG. 3, spindles 6 are guiding in sliding blocks 5a, 5b at both ends. At the ends facing away from the spindles 6, the sliding blocks 5a, 5b are supported on guiding discs 7a, 7b via contact balls 8. For this purpose, the guiding discs 7a, 7b are provided with running grooves 20 on which the contact balls 8 may rotate. The guiding discs 7a, 7b, via lower coupling rods 9b and upper coupling rods 9a arranged in pairs, are connected to each other so as to be movable in the same direction. For this purpose, the ends of the coupling rods 9a, 9b are provided with coupling receiving means 21 which are articulated with coupling balls 22 secured at the guiding discs 7a, 7b.

As illustrated in FIG. 3, the guiding discs 7a, 7b, together with cylindrical segments 27 in sliding bushes 28, may be set relative to the input shaft 1 at different angles of attack 32.

As a result of the angles of attack 32, the sliding blocks 5a, 5b are displaced relative to each other. For this purpose the sliding blocks 5a, 5b are guided radially inside on guiding rails 14. The spindles 6 and the toothed segment bars 4 arranged thereon are axially moved relative to each other together with the sliding blocks 5a, 5b. The toothed segment bars 4 are also guided radially inside on the guiding rails 14. As a result of this axial displacement of the toothed segment bars 4, their teeth 19, in the course of one rotation, are offset so as to be inclined relative to the teeth 15 of the output gear 3 while transmitting an output torque.

The teeth 15 of the output gear 3 have a pitch circle radius 16 which touches the pitch circle radius 17 of the toothed segment bars 4. The teeth 15 of the output gear 3 are pressed so as to be concave relative to the output shaft 2. At one running end of the toothed segment bars 4, the output gear 3 is associated with a synchronizing gear 13. The synchronizing gear 13 may be rotated relative to the output gear 3.

As shown in FIG. 2, the teeth 19 of the toothed segment bars 4 are provided with inclined faces 33 at the running-in ends. In order to ensure that the teeth 19 of the toothed segment bars 4 move into the synchronizing gear 13 without any interference, both the tooth ends 29 at the synchronizing gear 13 and the inclined faces 33 at the toothed segment bars 4 are designed so as to converge into a point at a predetermined angle and be radially offset so as to be inclined relative to each other.

As can be seen in FIG. 1, the sliding blocks 5a, 5b, at the ends facing away from the spindle, are provided with radial ball running tracks 23 in which the contact balls 8 are guided. The sliding blocks 5a, 5b are axially movable in prisms or recesses 34 on the guiding rails 14. The angle of attack of the guiding discs 7a, 7b effecting the axial displacement of the sliding blocks 5a, 5b may be varied by an adjusting gear 26, for example, as illustrated in FIG. 3.

The number of toothed segment bars 4 is not fixed, but the distance 25 between the individual toothed segments should be kept as narrow as possible.

The upper part of FIG. 3 shows the input shaft 1 and the axially movable sliding blocks 5a, 5b engaging the input shaft 1 and rotating with it. Always between two sliding blocks there are provided spindles 6 on which toothed segment bars 4 are held axially, with the spindles being blocked. The sliding blocks 5a, 5b are supported on the guiding discs 7a, 7b which are inclined in parallel, which are held in parallel via the coupling rods 9a, 9b and which are adjustable via an adjusting spindle 18 operated by the manual adjustable gear 26. The guiding discs 7a, 7b are supported on the housing via cylindrical segments 27 in the sliding bushes 28. The contact between the sliding blocks 5a, 5b and the guiding discs 7a, 7b is effected by the contact balls 8 which run in the ball grooves 23 in the sliding blocks 5a, 5b and in the grooves 20 (not shown) in the guiding discs 7a, 7b and which, as a result of the inclined position of the discs during the engagement of a toothed segment bar 4, engage the output gear 3 attached to the output shaft 2 positioned at a right angle relative to the input shaft 1. In front of the output gear 3 there is arranged the synchronizing gear 13, with the teeth having an inclined face 33 to improve the running-in properties of the segment bar teeth 19. An angle scale 32 indicates the angle of attack of the guiding discs which determines the transmission ratio and which may be set via the zero position towards both sides, thus permitting a reversal of the direction of rotation of the output end while the direction of rotation of the input end remains the same.

Figure 4:
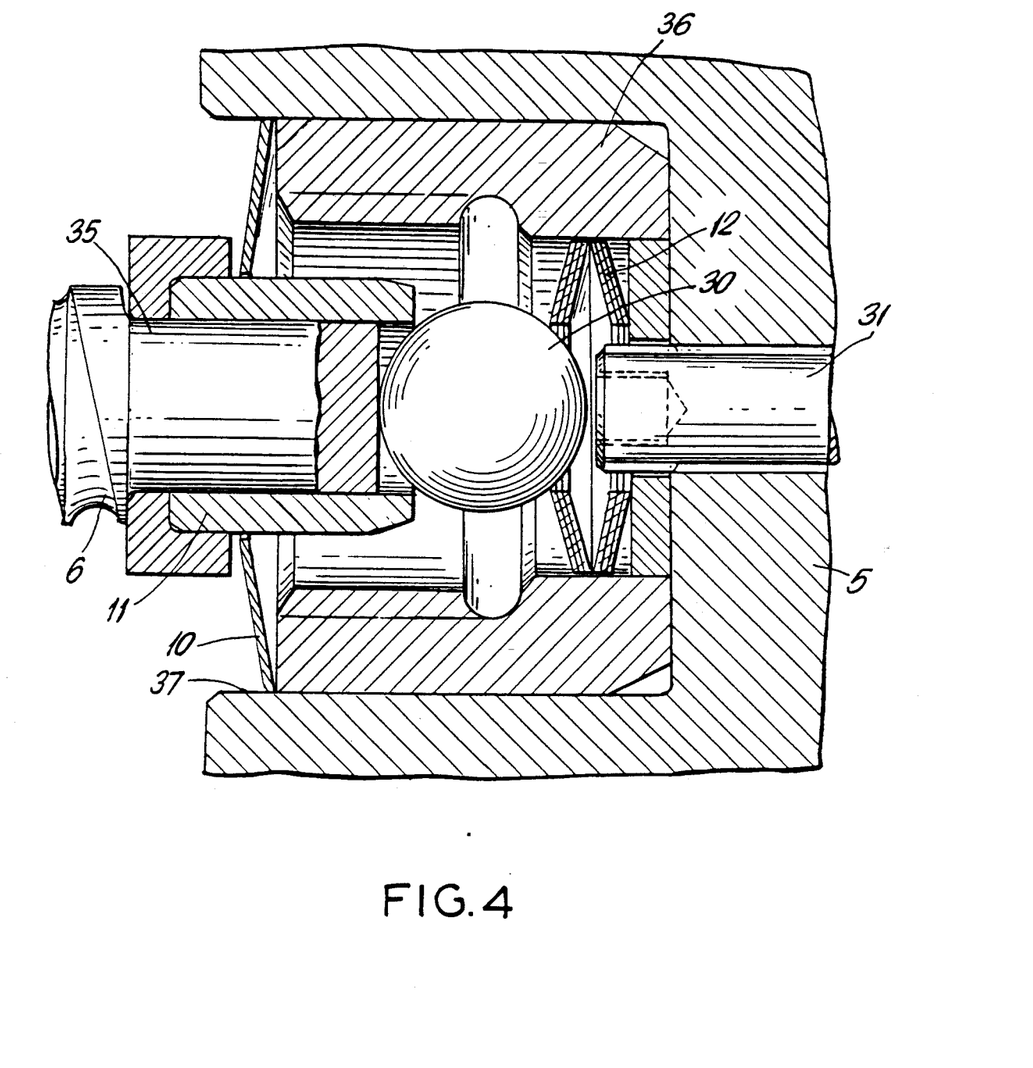
FIG. 4 is a longitudinal section through the locking means for the spindles of a continuously controllable drive in accordance with circled section IV of FIG. 1.

To block the relative movement between the spindles 6, the sliding blocks 5a, 5b and the toothed segment bars 4, the spindle journals 35 at the axial ends of the spindles 36 are each provided with a shrunk-on sleeve 11. By means of these shrunk-on sleeves 11, the spindles 6 are introduced into an axial bore 37 in the associated sliding blocks 5a, 5b. The axial bore 37 contains a contact sleeve 36 on which a diaphragm expanding spring 10 is supported. If an axial force acts on the diaphragm expanding spring 10 via the sliding block 5, the spring 10 applies an annular tensioning force to the sleeve 11, thereby preventing the spindle 6 from rotating. In consequence, the spindle 6 is non-rotatingly connected to the sliding block 5 of the associated toothed segment bar 4, and, as in the case of a friction coupling, excessive torques may lead to slipping in order to avoid any damage in the drive.

In order to ensure constant contact between a spindle 6 and the associated sliding block 5, a spring package 12 is arranged in the contact sleeve 36 at the end facing away from the spindle journal 35. This spring package 12, by means of a contact pin 31 arranged in the sliding block 5, acts via a contact ball 30 against the spindle journal 35 of the spindle 6, thereby permitting axial displacement on the guiding discs 7a, 7b to be offset in the course of a rotation.

Figure 5:
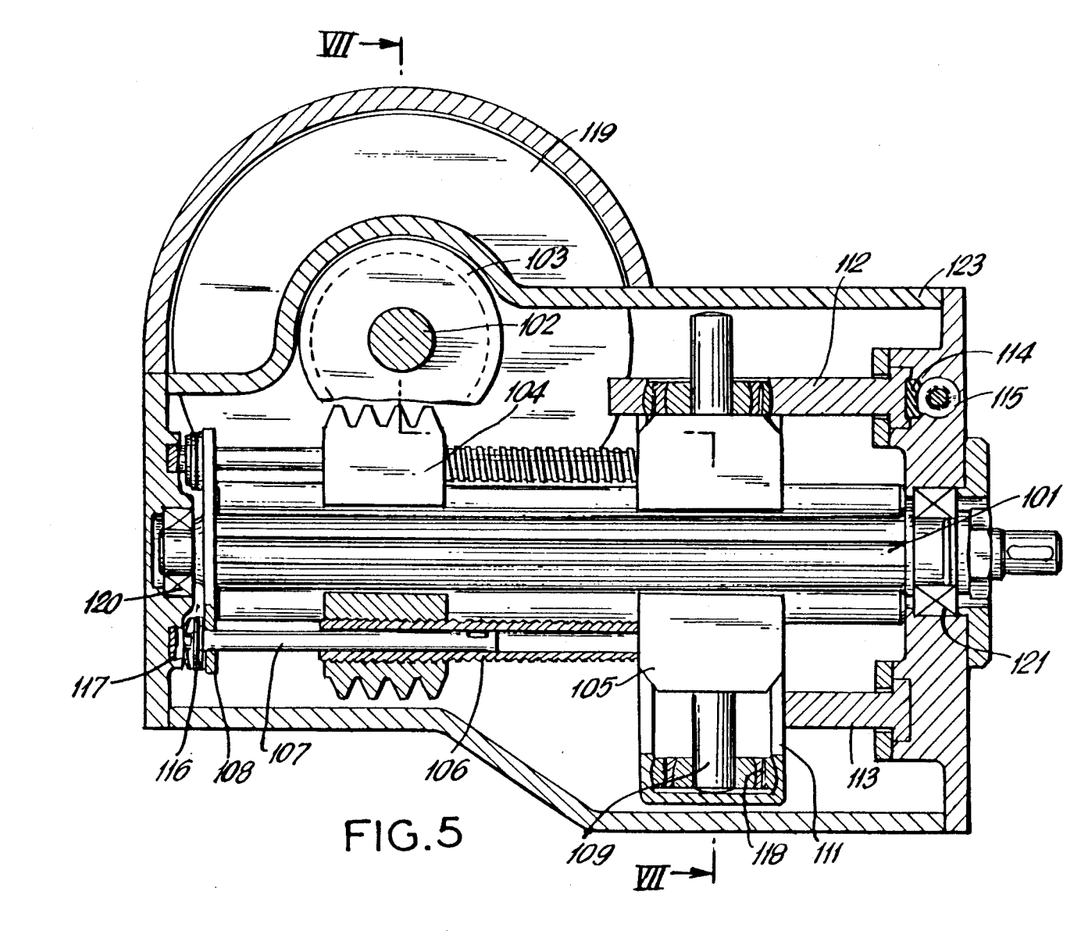
FIG. 5 shows a vertical longitudinal section through a drive in accordance with the invention.
Figure 6:
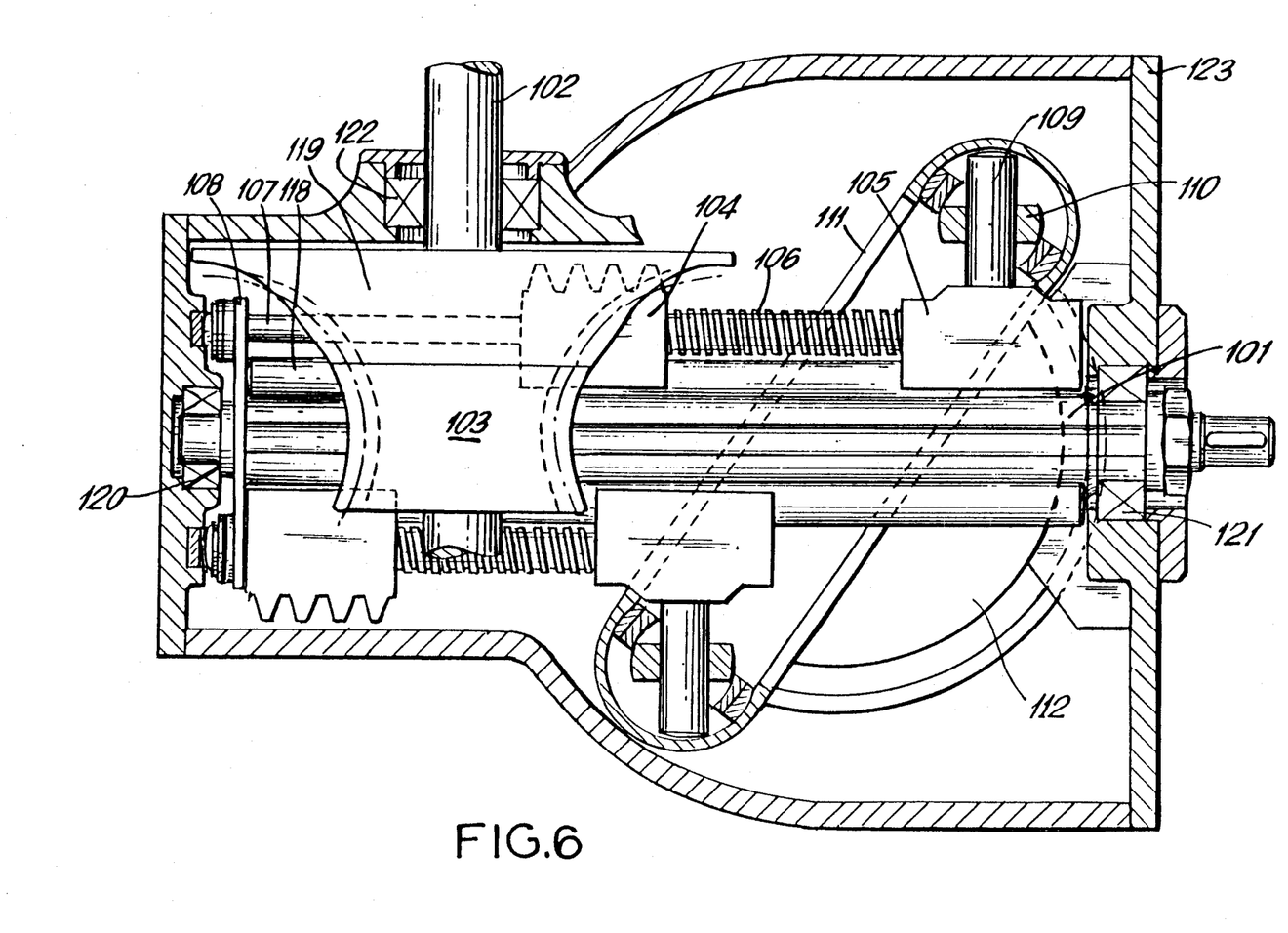
FIG. 6 is a horizontal section through the drive according to FIG. 5.
Figure 7:
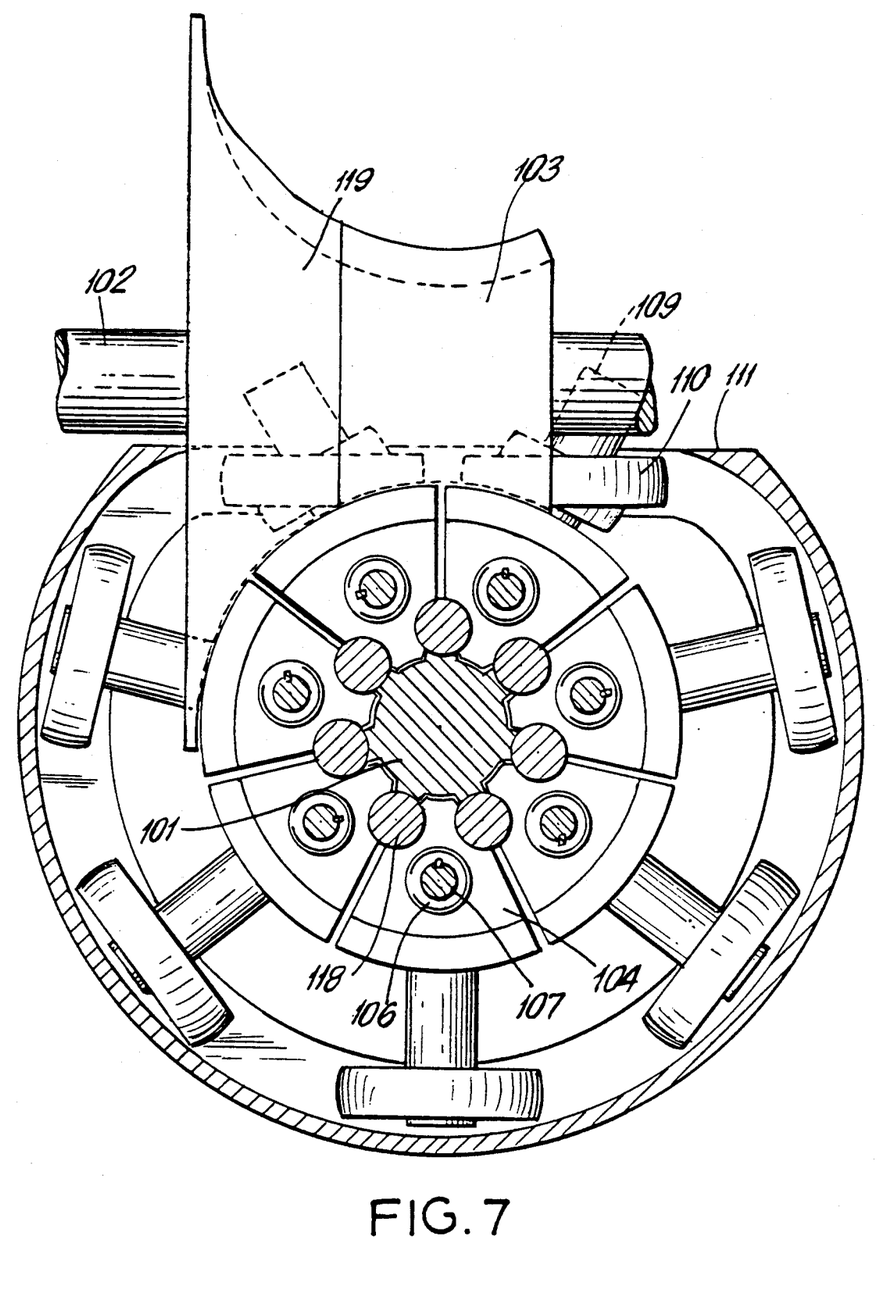
FIG. 7 is a vertical section along line III—III through the drive according to FIG. 5.

The continuously controllable drive as illustrated in FIGS. 5 to 7 comprises an input shaft 101 relative to which toothed segment bars 104 are arranged so as to be non-rotatingly, but axially movably connected.

An output shaft 102 intersecting the input shaft 101 at right angles carries an output gear 103 which may be connected to the toothed segment bars 104 so as to establish an operating connection.

The toothed segment bars 104 are axially movable on hollow spindles 106 which, at one end, are rotatably held in control heads 105. The hollow spindles 106 slide on bars 107 which are held jointly in a head disc 108 positioned concentrically relative to the input shaft 101. The hollow spindles and bars are connected non-rotatingly. The spindles 106 are provided with head pieces 105 with radial journals 109 on which guiding rollers 110 are radially displaceable in a way similar to pivot roller bearings. The guiding rollers 110 engage a substantially annular, inwardly opening guiding track 111 which, as illustrated in FIG. 6, is pivotable around an axis of adjustment extending at right angles relative to the axes of rotation of the shafts and which, as illustrated in FIG. 7, in the region where the teeth of the toothed segment bars and those of the output gear engage, extends rectilinearly in a plane parallel to the two axes. The pivotable design of the guiding rollers 101 permits an accurately rolling engagement between the guiding rollers 110 and the guiding track 11 in this region. The guiding track 111 is held by an upper circular disc segment 112 and supported on a lower circular disc segment 113. These, at the circular arch, are provided with dovetail-like guiding means relative to the housing 123, with the upper circular disc segment 112, on the outside, being provided with a gear ring 114 which may be rotated via an adjusting spindle 115.

The angle between the central plane through the guiding track 111 and the axis of rotation of the output gear determines the axial stroke of the toothed segment bars 104 in the course of a rotation of their control heads 108 in the guiding track 111 and in consequence, especially the axial feed while their teeth engage the teeth of the output gear 103. Because of the continuous adjustment of the guiding track 111, axial coupling between the toothed segment bars 104 and the spindles 106 has to be eliminated when the teeth are not engaged. It is only during the period of tooth engagement that it is possible to fix the bars 107 and thus the hollow spindles 106 in the direction of rotation and thus to secure the toothed segment bar 104 relative to the hollow spindles 106 via a friction coupling assembly 116 at the end of the bars 107 which cooperate with a cam track 117 in the housing. For reasons of safety, excessive torques may lead to slipping in order to avoid any damage in the drive.

It can be seen in FIG. 7 that during the forward feed of the head pieces 106, as a result of the influence of the guiding rollers 110 on the journals 109, both the head pieces 106 and the toothed segment bars 104 axially slide relative to the input shaft 101 on guiding bars 118 non-rotatingly supported on the input shaft 101 and relative to each other. To initiate the engagement between the teeth of the released toothed segment bars 104 and those of the output gear 103 there follows a synchronizing gear 119 which substantially runs out in a radial face and in which the toothed segment bars 104 which are still axially movable relative to the spindle 106 find tooth engagement with the output gear 103. Prior to entry into the output gear 103, the toothed segment bars 104 are axially fixed relative to the spindle 106 by a friction coupling assembly 116 in order to ensure the transmission of torque by means of their axial movement component. Input shaft 101 and output shaft 102 are supported in the housing 123 in the usual way in bearings 120, 121, 122 illustrated only symbolically.

Figure 8:
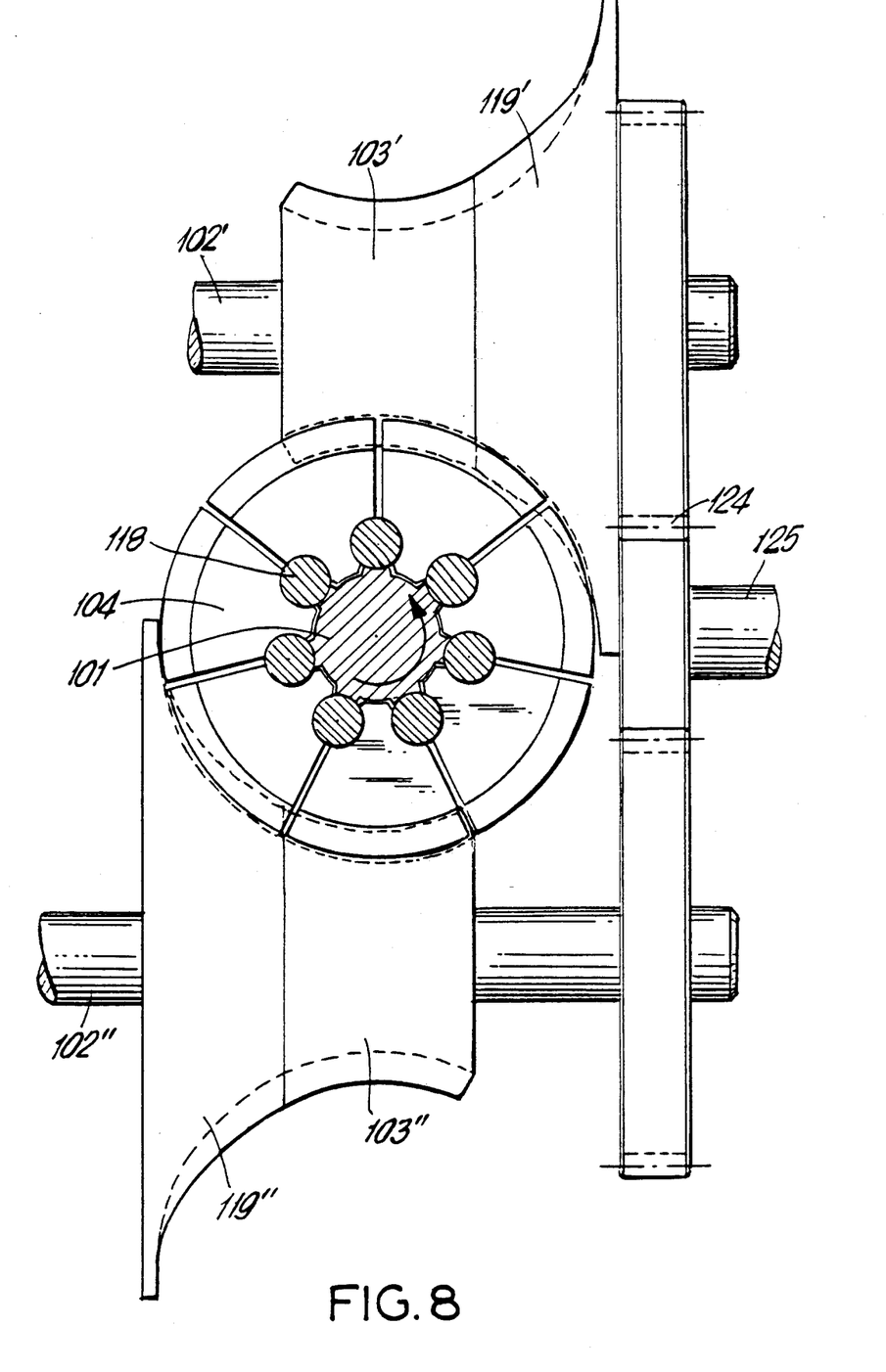
FIG. 8 in the form of details, shows an input shaft with toothed segment bars and two output gears arranged symmetrically relative to each other.

FIG. 8 shows how it is possible, by symmetrically arranging in tandem two output gears 103', 103'' with the respective synchronizing gears 119', 119'', to achieve the engagement of the teeth of the toothed segment bars 104 around a larger part of their track circumference. For this purpose it is necessary to flatten the guiding track 111 on both opposite ends in the region of tooth engagement and to support them relative to the housing on both straight track regions in both directions. The two output shafts 102', 102" have to be coupled via a spur gear drive 124 so that they operate on a joint output shaft 125.

Figure 9:
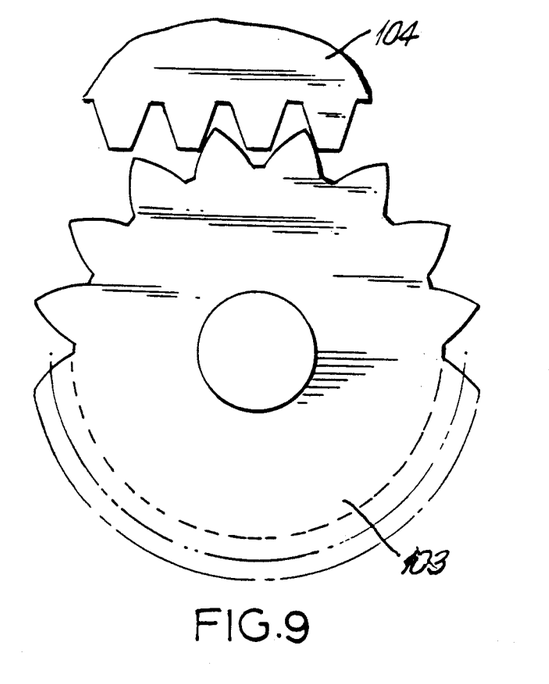
FIG. 9 shows a cross-section through an output gear.

FIG. 9 shows the cross-section of the output gear 103 having standard involute teeth and a straight-flanked toothed segment bar 104 between which there continuously exists a double tooth engagement.

Figure 10:
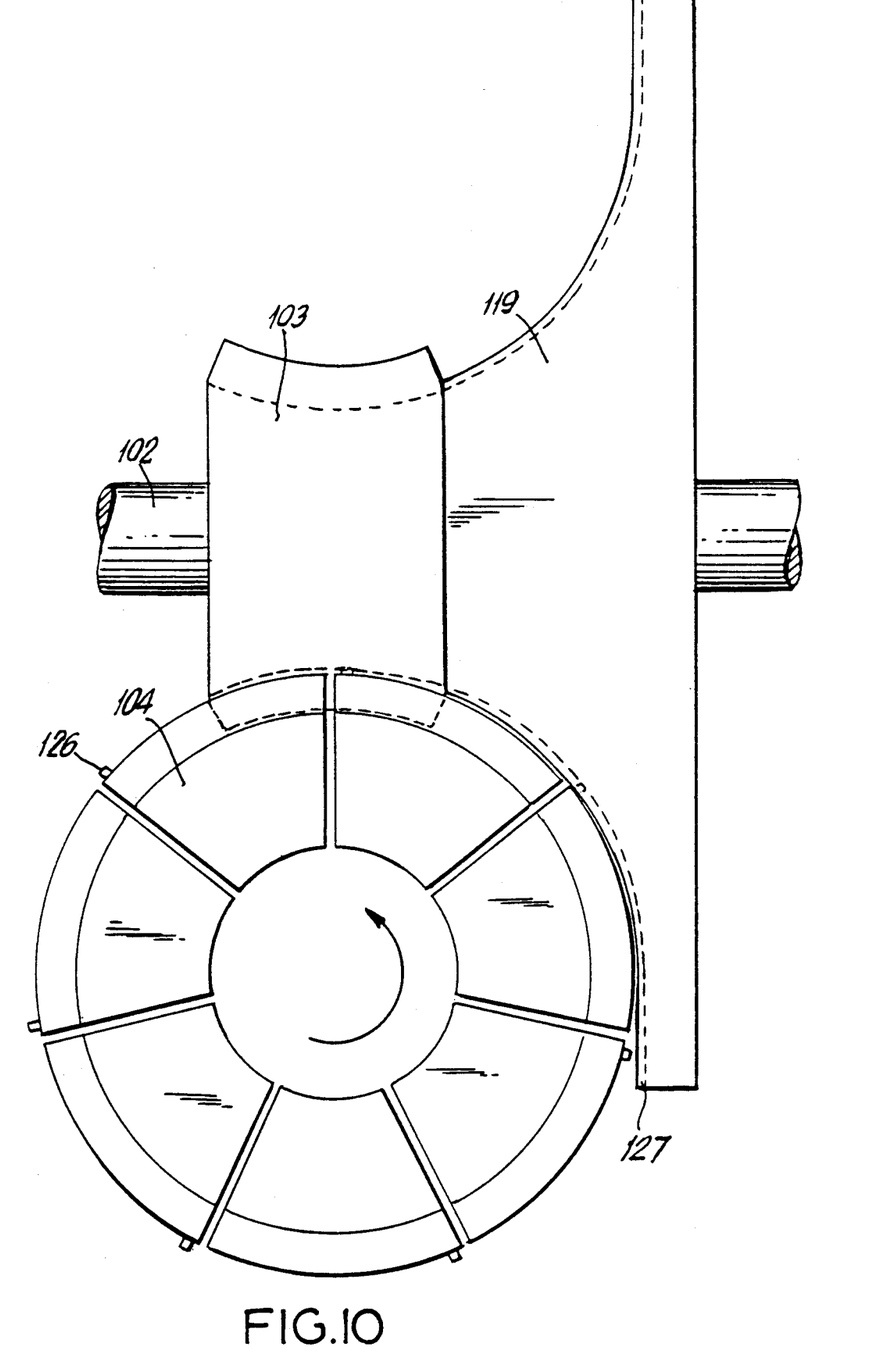
FIG. 10 shows an output gear with a first embodiment of a synchronizing gear connected in front.

FIG. 10 illustrates an output gear 103 of standard design, having a synchronizing gear 119 which tangentially follows the tooth root of the output gear 103 and approximately ends in a radial face. The toothed segment bars 104 are provided with spring-loaded guiding pins 126 which may cooperate with guiding edges 127 on the synchronizing gear 119.

Figure 11:
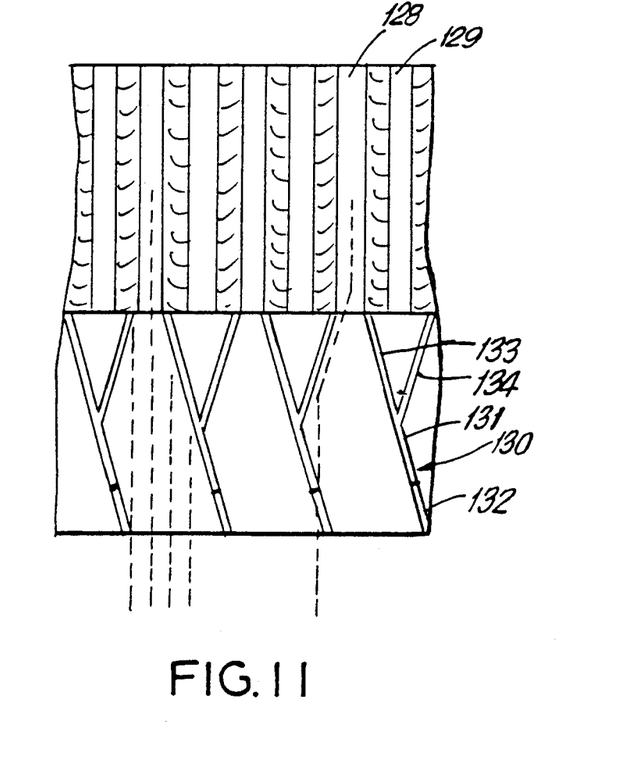
FIG. 11 shows a detail according to FIG. 10.

FIG. 11 shows the tooth roots 128 and tooth heads 129 in the developed view of an output gear 103 as well as the developed view of a synchronizing gear 119 comprising Y-shaped guiding strips 130 whose front end 131 is provided with an inclined stop face 132 and from whose forked arms 133, 134 there are branched off guiding pins or guiding rollers at the teeth of the output gear 103 and guided into the regions of the tooth roots 129. Possible ways of tooth entry are illustrated in dashed lines.

Figures 12, 13:
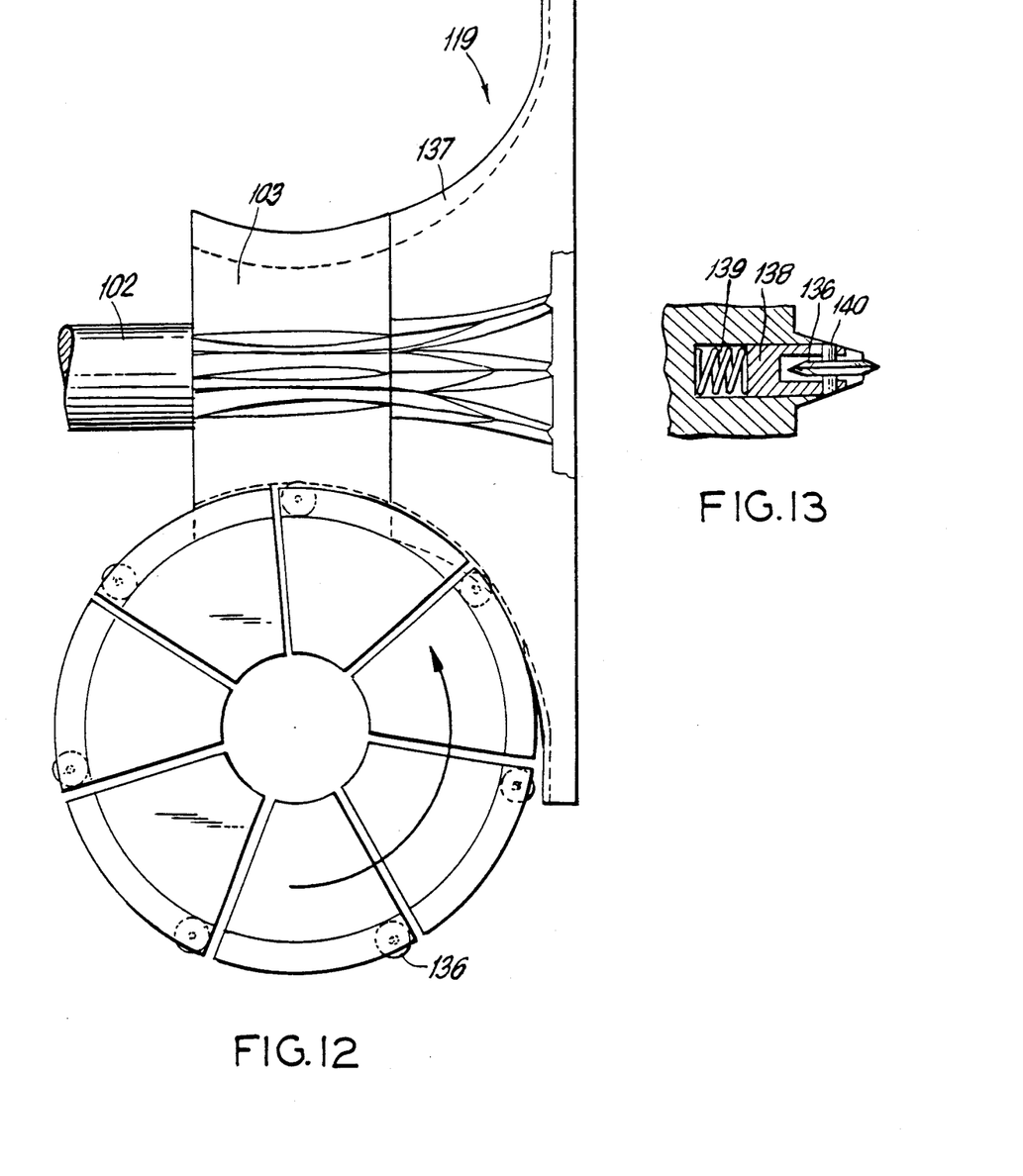
FIG. 12 shows an output gear with a second embodiment of a synchronizing gear connected in front.
FIG. 13 shows a detail according to FIG. 12.

FIG. 12 shows an output gear 103 in standard design, having a synchronizing gear which, with identical tooth shapes, tangentially follows the teeth of the output gear 103 and which, with an increasing positive profile displacement and pitch aperture, ends in an approximately radial plane while its teeth disappear. The toothed segment bars 104 are provided with spring-loaded rollers 136 which may cooperate with the guiding teeth 137 at the synchronizing gear 119.

FIG. 13, in the form of a detail, shows a section of a guiding roller provided with a roller holder 138, a pressure spring 139 and an axis 140 transversely displaceable in the roller holder.

While the invention has been illustrated and described as embodied in a continuously controllable drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A continuously controllable drive having a form-fitting power transmitting system as a result of a discontinuous engagement of paired teeth, comprising: an input shaft (1, 101); an output shaft (2, 102); a first tooth assembly with toothed segment bars (4, 104) which comprise teeth of uniform cross-sections with curved center lines which extend in a direction of circumferential lines relative to the axis of the input shaft (1, 101) to which they are non-rotatingly as well as axially movably and fixably connected, and whose radius of curvature corresponds to the radius of rotation of the toothed segment bars (4, 104) around the input axis (1, 101); a second set of teeth at an output gear (3, 103) which comprises teeth of variable cross-sections with curved center lines which extend in a direction of cylindrical lines relative to the axis of the output shaft (2, 102) to which it is connected, whose radius of curvature corresponds to that of the teeth of the toothed segment bars (4, 104), but in a concave shape, and which, starting from a minimum means cross-section of the output gear (3, 103) towards its sides, comprises a positive profile displacement and a pitch aperture; and an adjustable control device for the toothed segment bars (4, 104) which comprises rotational guiding means (7, 111) which establish an operating connection with the latter and which are pivotable around at least one axis of adjustment extending at a right angle relative to the axes of the input and output shafts (1, 101; 2, 102).

2. A continuously controllable drive according to claim 1, wherein the rotational guiding means (7, 111) acts on one of bars and spindles (6, 106) which are axis-parallel relative to the input shaft and are rotatable therewith and on which the toothed segment bars (4, 104) are axially movable and fixable, the toothed segment bars (4, 104) and the bars or spindles (6, 106) establishing an operating connection with the output gear (3, 103), and each representing a power transmitting unit which does not change the relative positions.

3. A continuously controllable drive according to claim 2, wherein the rotational guiding means (7, 111) includes guiding discs (7) provided at both ends at the spindles (6), the guiding discs (7) being connected to each other via coupling rods (9) articulated at both ends.

4. A continuously controllable drive according to claim 3, wherein both ends of the spindles (6) carrying the toothed segment bars (4) are held in sliding blocks (5), the sliding blocks (5) being rotatable around the input shaft (1) on contact balls (8) guided in running grooves (20) in the guiding discs (7).

5. A continuously controllable drive according to claim 4, wherein the toothed segment bars (4) are guided radially inside on guiding rails (14) arranged concentrically relative to the input shaft (1), the guiding rails (14) being inserted into prisms (24) on the input shaft (1) and connected to the input shaft (1).

6. A continuously controllable drive according to claim 5, wherein the sliding blocks (5) are held radially inside on the guiding rails (14) while being axially movable relative to each other.

7. A continuously controllable drive according to claim 4, wherein spindle journals (35), provided at both ends of the spindles (6), run in bores (37) of associated sliding blocks (5, 5a) and are non-rotatingly securable in the bores (37) by diaphragm expanding springs (10).

8. A continuously controllable drive according to claim 7, and further comprising contact sleeves (36) inserted into the bores (37) of the sliding blocks (5, 5a), contact balls (30) loaded by spring packages (12) being arranged in the contact sleeves (36) and the spindle journals (35) of the spindles (6) being axially movable in the sliding blocks (5, 5a) via the contact balls (30).

9. A continuously controllable drive according to claim 8, wherein the spring packages (12) are arranged so as to ensure contact between the sliding blocks (5), the contact balls (30) and the spindle journals (35) of the spindles (6) via contact pins (31) provided at the sliding blocks (5) and having a friction coupling effect.

10. A continuously controllable drive according to claim 2, wherein the rotational guiding means (111) includes an inwardly opening guiding track engaged by driving elements which, by means of head pieces (105), are connected to the bars or spindles (106) of the toothed segment bars.

11. A continuously controllable drive according to claim 10, wherein the spindles (106) are hollow spindles and slide on bars (107) which are axis parallel relative to the input shaft and are rotatable therewith.

12. A continuously controllable drive according to claim 11, wherein the bars (107) in the hollow spindles (106) are non-rotatingly connected to the spindles while being directly securable.

13. A continuously controllable drive according to claim 11, and further comprising a friction coupling (10, 116) which, during engagement between a toothed segment bar (4, 104) and the output gear (3, 103), acts on the respective bar (107) or spindle (6, 106).

14. A continuously controllable drive according to claim 10, wherein the driving elements comprise radial journals (109) on which rollers (110) are held so as to be radially movable.

15. A continuously controllable drive according to claim 14 wherein the rollers (110) are supported in roller bearings.

16. A continuously controllable drive according to claim 14, wherein the rollers (110) have a design similar to that of pivot bearings.

17. A continuously controllable drive according to claim 10, wherein the toothed segment bars (4, 104) run on the bars (104) or spindles (6, 106) while being supported on rotating balls.

18. A continuously controllable drive according to claim 10, wherein the toothed segment bars (4, 104) and the sliding blocks and head pieces (105) respectively are held and axially movable on guiding rails (14, 118) which form-fittingly engage the input shaft.

19. A continuously controllable drive according to claim 1, wherein the rotational guiding means (7, 111), has one portion in the region where the teeth of the toothed segment bars (4, 104) engage the teeth of the output gear (3, 103) which extends rectilinearly in a plane which is parallel to the axes of rotation of the input and output shafts (1, 1; 101, 102).

20. A continuously controllable drive according to claim 1, wherein the rotational guiding means (7, 111) are connected to guiding means (27, 112, 113) which are arranged concentrically relative to their axis of adjustment, and which have a circle segment shape and are pivotable around the axis of adjustment.

21. A continuously controllable drive according to claim 20, wherein the guiding means includes two circular-arch-shaped dovetail guiding elements at least one of which carries outer teeth which are driveable via a worm gear.

22. A continuously controllable drive according to claim 1, wherein the teeth of the toothed segment bars (4, 104) are provided with straight flanks.

23. A continuously controllable drive according to claim 1, wherein the teeth of the output gear (3, 103) are involute teeth.

24. A continuously controllable drive according to claim 1, wherein the toothed segment bars (4, 104) have a running-in end at which the output gear (3, 103) is directly tangentially followed by a synchronizing gear (13, 119) having teeth that disappear with an increasing positive profile displacement and which runs out in a nearly radial face.

25. A continuously controllable drive according to claim 24, and further comprising one of radially lowerable guiding rollers (136) and guiding pins (126) provided at the running-in end faces of the teeth of the toothed segment bars (4, 104), and which are spring-loaded relative to the output gear (3, 103).

26. A continuously controllable drive according to claim 25, wherein the guiding rollers (136) are supported with play transversely to a running-in direction.

27. A continuously controllable drive according to claim 1, wherein the toothed segment bars (4, 104) have a running-in end at which the output gear (3, 103) is directly tangentially followed by a synchronizing gear (13, 119) which, while having a round cross-section, starts at the tooth roots and runs out in a nearly radial plane which is provided with guiding ribs (130) which each embrace an end face of a tooth of the output gear (3, 103).

28. A continuously controllable drive according to claim 27, and further comprising one of radially lowerable guiding rollers (136) and guiding pins (126) provided at the running-in end faces of the teeth of the toothed segment bars (4, 104), and which are spring-loaded relative to the output gear (3, 103).

29. A continuously controllable drive according to claim 28, wherein the guiding rollers (136) are supported with play transversely to a running-in direction.

30. A continuously controllable drive according to claim 1, wherein two assemblies are provided which each have an output shaft (107) and are arranged symmetrically relative to the input shaft (1, 101), the output gears (3, 103) of the output shaft (107) engaging the toothed segment bars (104) at opposite ends.

* * * * *

UNITED STATES PATENT AND TRADEMARK OFFICE
CERTIFICATE OF CORRECTION

PATENT NO. : 5,057,057

DATED : October 15, 1991

INVENTOR(S) : Helmut Riemscheid et al

It is certified that error appears in the above-identified patent and that said Letters Patent is hereby corrected as shown below:

On the title page, Item (73) Assignee:   GKN Automotive AG
                                         Federal Republic of Germany

Signed and Sealed this
Sixteenth Day of March, 1993

*Attest:*

STEPHEN G. KUNIN

*Attesting Officer*      *Acting Commissioner of Patents and Trademarks*